United States Patent Office 3,329,738
Patented July 4, 1967

3,329,738
COATING COMPOSITIONS CONTAINING POLY-
ESTERS OF 2,4,6-TRIOXO-S-TRIAZINE-1,3,5(2H,
4H,6H)-TRIALKANOIC ACID AND A POLYHY-
DRIC ALCOHOL, WITH A POLYEPOXIDE AND
AN AMINOPLAST RESIN
Robert W. Hill, Leawood, and Francis R. Galiano,
Prairie Village, Kans., assignors to Gulf Oil Corpora-
tion, Pittsburgh, Pa., a corporation of Pennsylvania
No Drawing. Filed Sept. 8, 1964, Ser. No. 395,010
10 Claims. (Cl. 260—835)

This invention relates to coating compositions, methods for coating thermoplastic polymer articles with such coating compositions, and to thermoplastic polymer articles coated therewith.

It is recognized that the utility of many polymer articles can be improved by applying a suitable coating thereto. The coating compositions that have been available for such purposes have been deficient in many respects. In particular, many of the coating compositions presently available to the art either require that the polymer surface to be coated receive a preliminary treatment to promote adhesion, or require long baking cycles to cure the coating, or can be used only on a limited number of polymer substrates. In addition, such coatings tend to be brittle and crack on flexing.

It is an object of this invention to provide novel coating compositions.

Another object of this invention is to provide novel coating compositions which have good adhesion to a number of polymer substrates.

A further object of this invention is to provide novel coating compositions which adhere well to a number of polymer substrates and require only modest baking cycles to effect cure.

Yet another object of this invention is to provide polymer articles bearing thereon novel coatings which are flexible and resist cracking.

A still further object of this invention is to provide methods for depositing novel coatings on polymer articles.

Other objects and advantages of this invention will be apparent from the following detailed description thereof.

The above and other related objects and advantages are attained by providing coating compositions which comprise a solvent solution of 100 parts per weight of a polyester reaction product of a 2,4,6-trioxo-s-triazine-1,3,5 (2H,4H,6H)-trialkanoic acid and a polyhdric alcohol and about 10–120 parts per weight of an epoxy compound containing an average of at least 1.2 epoxy groups per molecule. Optionally, an aminoplast resin can be included in the coating compositions in the ratio of 10–70 parts per 100 parts of the polyester resin and in many cases improves the properties of the coating compositions. A wide variety of polymers such as polyethylene can have their properties improved by being coated with the coating compositions of this invention.

The following examples are set forth to illustrate more clearly the principle and practice of this invention to those skilled in the art. Unless otherwise noted, where parts or quantities are mentioned, they are parts or quantities by weight.

POLYESTER RESIN COMPONENT

The below-described polyester resins are prepared for use in the coating compositions to be subsequently described.

POLYESTER RESIN A

A mixture of 414 grams (1.2 mols) of 2,4,6-trioxo-s-triazine-1,3,5(2H,4H,6H)-tripropionic acid and 292 grams (2.8 mols) of neopentyl glycol was heated for two hours at 120° C. Adipic acid (68.5 grams, 0.4 mol) was added and heating was continued at 120–125° C. for 6 hours and at 145–150° C. for 3 hours to give a product having an acid number of 50–55 (mg. KOH per g. of resin). The resin syrup was diluted with methyl ethyl ketone to 80% resin solids.

POLYESTER RESIN B

Polyester Resin B was prepared in exactly the same manner as Polyester Resin A except for the fact that the 2,4,6-trioxo-s-triazine-1,3,5(2H,4H,6H)-tripropionic acid was replaced with an equivalent quantity of 2,4,6-trioxo-s-triazine-1,3,5(2H,4H,6H)-triacetic acid.

POLYESTER RESIN C

A mixture of 104 grams (0.3 mol) of 2,4,6-trioxo-s-triazine-1,3,5(2H,4H,6H)-tripropionic acid, 53.3 grams (0.7 mol) of 1,2-propanediol and 14.6 grams (0.1 mol) of adipic acid was heated at 160° C. for 8 hours to obtain a resin having an acid number of 55. The resin was diluted to 80% solids with methyl ethyl ketone.

POLYESTER RESIN D

A resin was prepared according to the procedure described for Polyester Resin C employing 104 grams (0.3 mol) of 2,4,6-trioxo-s-triazine-1,3,5(2H,4H,6H-tripropionic acid, 62.4 grams (0.6 mol) of neopentyl glycol, 14.6 grams (0.1 mol) of adipic acid, 13.6 grams (0.1 mol) of pentaerythritol and 28 grams (approximately 0.1 mol) of tall oil fatty acids. The resin syrup was diluted to 80% solids with methyl ethyl ketone.

POLYESTER RESIN E

A mixture of 690 grams (2.0 mols) of 2,4,6-trioxo-s-triazine-1,3,5(2H,4H,6H)-tripropionic acid, 485 grams (4.66 mols) of neopentyl glycol and 97.2 grams (0.67 mol) of adipic acid was heated for 6.5 hours at 145–150° C. to obtain an acid number of 54. The resin syrup was diluted to 80% solids with methyl ethyl ketone.

POLYESTER RESIN F

A mixture of 230 grams (0.67 mol) of 2,4,6-trioxo-s-triazine-1,3,5(2H,4H,6H)-tripropionic acid and 139 grams (1.33 mols) of neopentyl glycol were esterified by heating at 150–160° C. until the resin has an acid number of 45. The resin syrup was diluted to 80% solids with methyl ethyl ketone.

POLYESTER RESIN G

A resin was prepared from a mixture of 104 grams (0.3 mol) of 2,4,6-trioxo-s-triazine-1,3,5(2H,4H,6H)-tripropionic acid, 46 grams (0.6 mol) of propylene glycol, 13 grams (0.1 mol) of 2-ethylhexanol and 14.6 grams (0.1 mol) of adipic acid. The reactants were heated at 140–160° C. for 8 hours to provide a resin having an acid number of 75. The resin syrup was diluted to 80% solids with methyl ethyl ketone.

POLYESTER RESIN H

A resin was prepared from a mixture of 104 grams (0.3 mol) of 2,4,6-trioxo-s-triazine-1,3,5(2H,4H,6H)-tripropionic acid, 53 grams (0.7 mol) of propylene glycol and 32 grams (0.1 mol) of hexadecenyl succinic anhydride. The reaction mixture was heated for 5 hours at 160–180° C. to obtain a resin having an acid number of 110. The resin syrup was diluted to 80% solids with methyl ethyl ketone.

EPOXY COMPOUND COMPONENT

The below-described epoxy compounds are employed for use in the coating compositions to be subsequently described.

EPOXY COMPOUND A

Epoxy Compound A is a low molecular weight liquid condensation product of bisphenol-A and epichlorohydrin sold by the Shell Chemical Company under the trade name Epon 820. This compound has an epoxide equivalent weight of 185–205. This compound was diluted to 80% solids with methyl ethyl ketone.

EPOXY COMPOUND B

Epoxy Compound B is the diglycidyl ether of tetrachloro-bisphenol-A which is prepared by the method described in U.S. 3,074,974. This compound was diluted to 80% solids with methyl ethyl ketone.

EPOXY COMPOUND C

Epoxy Compound C is the triglycidyl ether of glycerine. This compound was diluted to 80% solids with methyl ethyl ketone.

EPOXY COMPOUND D

Epoxy Compound D is a medium molecular weight condensation product of epichlorohydrin and bisphenol-A sold as Epon 1004. This compound was diluted to 80% solids with methyl ethyl ketone.

AMINOPLAST RESIN COMPONENT

The below-described aminoplast resins are employed for use in certain of the coating compositions to be subsequently described.

AMINOPLAST RESIN A

Aminoplast Resin A is the hexamethylether of hexamethylolmelamine. This resin was diluted to 80% solids with methyl ethyl ketone.

AMINOPLAST RESIN B

Aminoplast Resin B is a butanol solution of a butyl ether of a melamine-formaldehyde resin. The solution contains 60% resin solids.

AMINOPLAST RESIN C

Aminoplast Resin C is a butanol solution of the butyl ether of dimethylol urea. The solution contains 60% resin solids.

COATING COMPOSITIONS

A series of coating compositions are prepared by blending together a polyester resin, an epoxy compound and a solvent. In some cases, an aminoplast resin and/or a plasticizer is included in the composition. In all cases, the compositions are formulated to contain about 40 parts of resin solids per 60 parts of solvent. In some cases, before the coating compositions are to be used, 1 part of triethylene tetramine will be added to the coating compositions in the ratio of 1 part of triethylene tetramine per 20 parts of epoxy compound. The formulations are set forth in Table I below.

TABLE I

| Component | A | B | C | D | E | F | G | H | J | K | L | M | O | P | Q | R | S | T | U | V | W | X | Y |
|---|---|---|---|---|---|---|---|---|---|---|---|---|---|---|---|---|---|---|---|---|---|---|---|
| Polyester Resin: | | | | | | | | | | | | | | | | | | | | | | | |
| A | 70 | 70 | 70 | 70 | 70 | 70 | 80 | 70 | 70 | 70 | | | | | | | | 35 | | | | | |
| B | | | | | | | | | | | 70 | | | | | | | 35 | | | | | |
| C | | | | | | | | | | | | 70 | | | | | | | | | | | |
| D | | | | | | | | | | | | | 70 | | | | | | | | | | |
| E | | | | | | | | | | | | | | 70 | | | | | | | | | |
| F | | | | | | | | | | | | | | | 70 | | | | 80 | 80 | 80 | 80 | 80 |
| G | | | | | | | | | | | | | | | | 70 | | | | | | | |
| H | | | | | | | | | | | | | | | | | 70 | | | | | | |
| Epoxy Compound: | | | | | | | | | | | | | | | | | | | | | | | |
| A | 30 | | | 30 | 30 | 30 | 20 | 30 | 30 | 30 | | 30 | 30 | 30 | 30 | 30 | 30 | 30 | | | | | |
| B | | 30 | | | | | | | | | | | | | | | | | | | | | |
| C | | | 30 | | | | | | | | | | | | | | | | | | | | |
| D | | | | | | | | | | | 30 | | | | | | | | 40 | 80 | 80 | 80 | 80 |
| Aminoplast Resin: | | | | | | | | | | | | | | | | | | | | | | | |
| A | | | | | | | | 20 | | 20 | | 20 | 20 | 20 | 20 | 20 | 20 | 20 | 40 | 40 | 40 | 40 | 40 |
| B | | | | | | | | | 20 | | | | | | | | | | | | | | |
| C | | | | | | | | | | | | | | | | | | | | | | | |
| Methyl Ethyl Ketone | 100 | 100 | 100 | 100 | 100 | 100 | 100 | 120 | 120 | 120 | 100 | 120 | 120 | 120 | 120 | 120 | 120 | 120 | 120 | 140 | 140 | 140 | 140 |
| Plasticizer A | | | | 10 | | | 10 | | | 10 | 10 | | 10 | 10 | 10 | 10 | 10 | 10 | | | 10 | | |
| Plasticizer B | | | | | 10 | | | | | | | | | | | | | | | | | 10 | |
| Plasticizer C | | | | | | 10 | | | | | | | | | | | | | | | | | 10 |

Plasticizer A is dioctyl cresyl phosphate.
Plasticizer B is dicarbitol phthalate (carbitol is the monoethyl ether of diethylene glycol).
Plasticizer C is the diester formed between 1 mol of adipic acid and the monooctanoate ester of 2,2,4-trimethyl pentanediol-1,3.

Example I

Coating Composition K was diluted to 30% resin solids with methyl ethyl ketone and triethylene tetramine was added thereto in the ratio of 1 part per 20 parts of the epoxy compound contained therein. The resulting solution was dip applied to an untreated (i.e. not flamed or otherwise oxidized) pint polyethylene bottle. The polyethylene was of the linear type having a density of 0.955 and was pigmented dark blue. The coated bottle was cured by heating for 15 minutes at 190° F. The resulting film had good adhesion (flexing and adhesive tape tests would not separate the film from the substrate), high gloss and anti-static properties.

Essentially comparable results are obtained when coating Composition K is replaced with, respectively, Coating Compositions A, B, C, D, E, F, G, H, J, L, M, O, P, Q, R, S, T, U, V, W, X, and Y.

Example II

About 40 natural polyethylene (density 0.948) 4-oz. Boston round bottles were flame treated and dip coated with an aqueous solution of Coating Composition O diluted to 30% solids and having triethylene tetramine added thereto in the ratio of 1 part per 20 parts of epoxy compound. The coated bottles were baked for 20 minutes at 185° F. No flash-off time was necessary. The film was tack-free upon removal from the oven. Gloss, adhesion and anti-static properties were all good.

Example III

Barrier properties for ethanol, turpentine, xylene, methyl isobutyl ketone, butyl acetate, acetic acid, n-heptane and carbon tetrachloride were determined on the bottles prepared in Example II. The bottles were filled about ⅔ full, capped and placed in a circulating oven at 140° F. (60° C.) for 4 days. As a control, uncoated bottles were similarly treated. The loss of contents was measured and in each case the coated bottles had a smaller loss of contents than the uncoated controls. In several cases the differences in loss of contents was substantial, particularly with xylene, n-heptane, and carbon tetrachloride.

*Example IV*

Films (2 mils thick) of several thermoplastic resins were coated with Coating Composition K (diluted to 30% resin solids with methyl ethyl ketone and having added thereto 1 part of triethylene tetramine per 20 parts of epoxy compound) to provide a wet film 0.5 mil thick. Each film was then heated for 15 minutes at 190° F. to cure the coating. The coatings showed adhesion to all of the polymer substrates.

The films employed in this example were fabricated from a homopolymer of ethylene having a density of 0.918, and interpolymer having polymerized therein 70% ethylene and 30% vinyl acetate, an interpolymer having polymerized therein 75% ethylene and 25% methyl acrylate, a homopolymer of propylene, a homopolymer of styrene, a high impact strength acrylonitrile, butadiene, styrene interpolymer having polymerized therein 28% acrylonitrile, 8% butadiene and 62% styrene, a vinyl chloride homopolymer, and a polycarbonate sold under the trade name Lexan.

Essentially comparable results are obtained when the thermoplastic resins are coated with Coating Compositions U, V, W, X and Y.

The coating compositions of this invention will contain, in a suitable solvent, 100 parts of the polyester resin and 10–120, preferably 40–120, and more especially 50–100 parts of the epoxy compound. Shortly before use, a conventional epoxy curing agent should be added to the coating compositions. Optionally, and preferably 10–70 and more especially 15–50 parts of an aminoplast resin may be included in the coating compositions of the invention. In many cases, the quality of the ultimate coating can be improved by including a plasticizer in the coating compositions. When a plasticizer is employed, it should be employed in the ratio of 5–30 and preferably 10–20 parts per 100 parts of the polyester resin.

The polyester resin component of the coating compositions of this invention are the type described in the co-pending application of L.V. Phillips and W.C. Francis, Ser. No. 110,901, filed May 23, 1961, and assigned to the assignee in the present application. Such polyester resins are prepared by reacting a 2,4,6-trioxo-s-triazine-1,3,5 (2H, 4H, 6H) trialkanoic acid with a polyhydric alcohol. The two primary reactants will be employed in such ratios that the resulting polyesters are thermoplastic. Ordinarily, a sufficient quantity of the polyhydric alcohol will be employed so that the resulting polyesters will have a hydroxyl number in excess of 50 and preferably in excess of 100. If desired, other polycarboxylic acids may be employed in the preparation of the polyester resins. Examples of such acids include succinic, maleic, glutaric, adipic, suberic, azelaic acids and alkyl substituted derivatives of these acids. In all cases, however, the 2,4,6-trioxo-s-triazine-1,3,5 (2H, 4H, 6H) trialkanoic acid should constitute at least about 30 mol percent of the polybasic acids employed in the preparation of the polyester resin. The polyhydric alcohols that may be employed include ethylene glycol, diethylene glycol, 1,3-propanediol, 1,2-propanediol, 1,4-butanediol, neopentyl glycol, glycerol, pentaerythritol, 2,2,4-trimethyl-1,3-pentanediol, sorbitol, and the like. If desired, small quantities of monobasic acids and monohydric alcohols also may be employed in the preparation of the polyester resins to control molecular weight, to modify properties and the like. In many cases, substantial advantages are obtained by including in the resins at least modest quantities of a monobasic acid derived from fatty oils such as oleic acid, tall oil fatty acids, soybean oil fatty acids, linseed oil fatty acids, etc.

The polyester resins can be prepared by techniques essentially similar to those employed in the manufacture of the well known alkyd resins. The reactants will be charged to a stirred autoclave and heated to temperatures in excess of 100° C. to esterify the carboxyl and hydroxyl groups of the reactants charged. The polymerization will be continued until the polyester resin is rather viscous and the acid number thereof is reduced to below 100 and usually to a value in the range of about 40–75.

The epoxy compounds included in the coating compositions of the invention will contain an average of at least 1.2 epoxy groups per molecule. The preferred epoxy compounds for use in this invention are the relatively high molecular weight condensation products formed between bisphenol A and epichlorohydrin. Scores of such compounds are commercially available with the currently preferred epoxy compound being a compound having the properties of the commercial product sold by the Shell Chemical Company under the trade name Epon 1004. Another suitable epoxy compound is the diglycidyl ether of tetrachlorobisphenol A which can be prepared by the method disclosed in U.S. 3,074,974. The polyglycidyl ethers of low molecular weight polyols such as ethylene glycol and glycerine also are eminently suitable for use in the invention. Yet another suitable class of suitable epoxy compounds consists of the epoxidized novolak resins.

A wide variety of aminopulast resins can be employed in the coating compositions of this invention. Ordinarily, it is possible to employ any aminoplast resin of the types that are employed in conjunction with alkyd resins in the manufacture of baking enamel. The currently preferred aminoplast resins are the methyl ethers of hexamethylomelamine. Various butylated melamine and urea resins are also very useful.

The coating compositions of this invention will consist of the resin components dissolved in a suitable solvent therefor. Virtually any of the common solvents can be employed, subject to the obvious limitation that the solvent must dissolve the polyester resin, the epoxy resin and, if employed, the aminoplast resin to be included in the coating composition. Typical solvents that can be employed include methyl ethyl ketone, carbitol acetate (carbitol being the monoethyl ether of diethylene glycol) n-butanol, sec-butanol, methyl isobutanol ketone, amyl acetate, dioxane, etc.

As earlier noted, plasticizers frequently are included in the coating compositions of the invention. Common plasticizers which are suitable for use in this invention include tricresyl phosphate, dioctyl phenyl phosphate, dioctyl phthalate, dioctyl adipate and didecyl phthalate. In addition to the foregoing, virtually any of the common and well known ester type plasticizers may be employed.

To obtain short curing cycles for the coating compositions of the invention, it is desirable to include therein a curing catalyst of the type commonly employed for the epoxy resins. The prime examples of such curing catalysts include the amines such as diethylene triamine, triethylene tetramine, benzyl dimethyl amine, pyridine, ethyl amine, 2,4,6-tris(dimethylaminomethyl) phenol, etc. Other of the known epoxy resin curing catalysts also can be employed, such as the boron trifluorideamine complexes.

In addition to the components previously set forth and described, the coating compositions of this invention can contain additional components of the type commonly employed in coating compositions. For example, the coating compositions may be colored with either oil or spirit-soluble colors or pigments such as carbon black, titanium dioxide, and the common pigments included in baking enamels. Stabilizers, anti-oxidants, anti-static agents, antiskinning agents and the like, may be employed if desired.

The polymers that can be coated with the coating compositions of the present invention are members of the following groups:

(A) Homopolymers of ethylene,
(B) Ethylene interpolymers containing at least 50% polymerized ethylene,
(C) Homopolymers of propylene,
(D) Homopolymers of styrene,
(E) Styrene interpolymers containing at least 50% polymerized styrene,
(F) Polycarbonates,
(G) Homopolymers of vinyl chloride,
(H) Vinyl chloride interpolymers containing at least 50% polymerized vinyl chloride,
(I) Nylon,
(J) Cellulose acetate,
(K) Cellulose propionate,
(L) Cellulose butyrate,
(M) Melamine-formaldehyde resins, and
(N) Phenol-formaldehyde resins.

The ethylene homopolymers that may be coated can be of the conventional high pressure type or the so-called linear type. In general any ethylene homopolymer having a density in the range of about 0.915 to 0.97 may be employed. The ethylene interpolymers that may be employed can be essentially any of the known ethylene interpolymers containing at least 50 weight percent of polymerized ethylene. Typical examples of such ethylene interpolymers include interpolymers of ethylene with vinyl acetate, methyl acrylate, methyl methacrylate, ethyl acrylate and the like. The propylene homopolymers that may be employed are the isotactic type that are prepared using the so-called Ziegler-type catalysts. The styrene homopolymers that may be employed are those of the type widely used commercially and that are prepared by either mass, emulsion or suspension polymerization methods. Styrene interpolymers that are particularly suitable for use in the invention include the so-called "rubber modified" styrene polymers which have high impact strength. Other suitable styrene interpolymers include styrene-acrylonitrile interpolymers and the so-called ABS polymers in which a styrene-acrylonitrile polymer is modified with a diene rubber to improve its impact strength. The polycarbonates that may be employed are the commercial products which are sold under the trade names of Lexan and Merlon.

The vinyl chloride homopolymers and interpolymers that are useful are of the types commercially available, particularly the homopolymers and the vinyl chloride-vinyl acetate copolymers. The nylons and various cellulosic polymers employed are of the commercially available type employed for molding applications. The melamine and phenolic resins that can be most advantageously coated are of the cured, filled type. In particular, dinnerware molded from filled melamine-formaldehyde resins can be coated to provide dinnerware having high gloss and good abrasion resistance.

The coated polymer articles provided by the present invention have many outstanding properties. Almost without exception, the coatings laid down on the substrate are glossy and aethetically pleasing. The coatings are tough and flexible, show good adhesion to the substrate, have good abrasion resistance, and have excellent resistance to a wide variety of solvents such as hydrocarbons, alcohols, ketones, alkalies and water. The coatings also have very low permeability to oxygen. Because of these properties, plastic containers such as bottles which are coated by the method of the invention have outstanding properties. In particular, such coated containers have particular utility in the packaging of cosmetics for such components as perfuming ingredients are not readily lost, as is the case when such cosmetics are packaged in conventional plastic containers. Similarly, in the packaging of foods and beverages, flavoring ingredients are not lost by diffusion, as is otherwise encountered when such materials are packaged in conventional plastic containers.

The plastic articles to be coated by the method of the invention can be coated by diverse methods commonly used in the art. For example, such articles can be coated by spraying, brushing, dipping, and the like. If desired, the plastic substrate to be coated can be given a preliminary treatment such as flaming, but this is ordinarily not required. Coatings of optimum properties are obtained by heating the coated article for relatively short times at elevated temperatures, e.g., 5–30 minutes at temperatures of 150–200° F.

The above description and particularly the examples are set forth for purposes of illustration only. Many variations and modifications thereof will be apparent to those skilled in the art and can be made without departing from the spirit and scope of the invention herein described.

What is claimed is:

1. A coating composition comprising a solvent solutions of (a) 100 parts by weight of a polyester reaction product of a 2,4,6-trioxo-s-triazine-1,3,5(2H, 4H, 6H)-trialkanoic acid and a polyhydric alcohol and (b) about 10–120 parts by weight of an epoxy compound containing an average of at least 1.2 epoxy groups per molecule.

2. A coating composition of claim 1 in which the epoxy compound is a condensate of bisphenol-A and epichlorohydrin.

3. A coating composition of claim 1 which also contains a soluble aminoplast resin in the ratio of about 10–70 parts per 100 parts of polyester reaction product.

4. A coating composition of claim 3 in which the aminoplast resin is a condensate of melamine and formaldehyde.

5. A coating composition of claim 3 in which the aminoplast resin is a condensate of urea and formaldehyde.

6. A coating composition of claim 1 in which the polyester reaction product is the reaction product of a 2,4,6-trioxo-s-1,3,5(2H, 4H, 6H)-trialkanoic acid, an aliphatic diol and a dicarboxylic acid.

7. A polymer base coated with the solids of the coating composition of claim 1; said polymer base being selected from the group consisting of:

(A) Homopolymers of ethylene,
(B) Ethylene interpolymers containing at least 50% polymerized ethylene,
(C) Homopolymers of propylene,
(D) Homopolymers of styrene,
(E) Styrene interpolymers containing at least 50% polymerized styrene,
(F) Polycarbonates,
(G) Homopolymers of vinyl chloride,
(H) Vinyl chloride interpolymers containing at least 50% polymerized vinyl chloride,
(I) Nylon,
(J) Cellulose acetate,
(K) Cellulose propionate,
(L) Cellulose butyrate,
(M) Melamine-formaldehyde resins, and
(N) Phenol-formaldehyde resins.

8. A coated article of claim 7 in which the coated polymer base is an ethylene homopolymer.

9. A coated article of claim 7 in which the coated polymer base is a styrene homopolymer.

10. A coated article of claim 7 in which the coated polymer base is a polycarbonate.

References Cited

UNITED STATES PATENTS 3,279,940   10/1966   Francis _____ 117—94

MURRAY TILLMAN, *Primary Examiner.*

P. LIEBERMAN, *Assistant Examiner.*